United States Patent [19]

Di Rosa

[11] 4,214,640
[45] Jul. 29, 1980

[54] MACHINE FOR THE AUTOMATIC MANUFACTURE OF MIXTURES OF DIFFERENT KINDS OF CAOUTCHOUC INTENDED TO FORM PART OF A FILLER MIXTURE

[75] Inventor: Gaetano Di Rosa, Pino Torinese, Italy

[73] Assignee: F.A.T.A.-Fabbrica Apparecchi di Sollevamento e Trasporto ed Affini S.p.A., Turin, Italy

[21] Appl. No.: 26,707

[22] Filed: Apr. 3, 1979

[30] Foreign Application Priority Data

Aug. 16, 1978 [IT] Italy ............................... 68911 A/78

[51] Int. Cl.² ..................... G01G 19/22; G01G 19/04; B26D 7/00
[52] U.S. Cl. ........................................ 177/70; 177/25; 83/77; 177/DIG. 11
[58] Field of Search ...................... 177/1, 50, 122, 123, 177/70, 25, DIG. 11; 83/77

[56] References Cited

U.S. PATENT DOCUMENTS

| | | | |
|---|---|---|---|
| 3,203,591 | 8/1965 | Daulton et al. | 177/70 X |
| 3,572,453 | 3/1971 | Hannum | 177/123 |
| 3,690,391 | 9/1972 | Rust | 177/1 |
| 3,846,958 | 11/1974 | Divan | 177/50 UX |
| 3,974,888 | 8/1976 | Murakami et al. | 177/1 X |
| 3,993,148 | 11/1976 | Keser et al. | 177/50 |
| 3,995,517 | 12/1976 | Smith | 177/50 X |
| 4,010,809 | 3/1977 | Hobart | 177/1 |
| 4,136,749 | 1/1979 | Di Rosa | 177/50 X |

*Primary Examiner*—George H. Miller, Jr.
*Attorney, Agent, or Firm*—Sughrue, Rothwell, Mion, Zinn and Macpeak

[57] ABSTRACT

A machine for the automatic preparation of proportions of different caoutchouc blocks for filler mixtures in rubber manufacture has conveyor lines for the different kinds of caoutchouc block, each including a measuring conveyor and a block-weighing conveyor. A movable band saw cuts off portions of the blocks projecting from the measuring conveyors while the latter are stationary, and a storage unit disposed downstream of the conveyor lines stores excess portions of blocks severed in one measuring to deliver them to a collector conveyor during a successive cycle, under control of a processor which memorises the required weights of the different kinds of caoutchouc and controls the conveyors, the cutting unit and the storage unit in dependence upon the stored data and data sent to it by the block weighing conveyors to give the required proportions.

10 Claims, 9 Drawing Figures

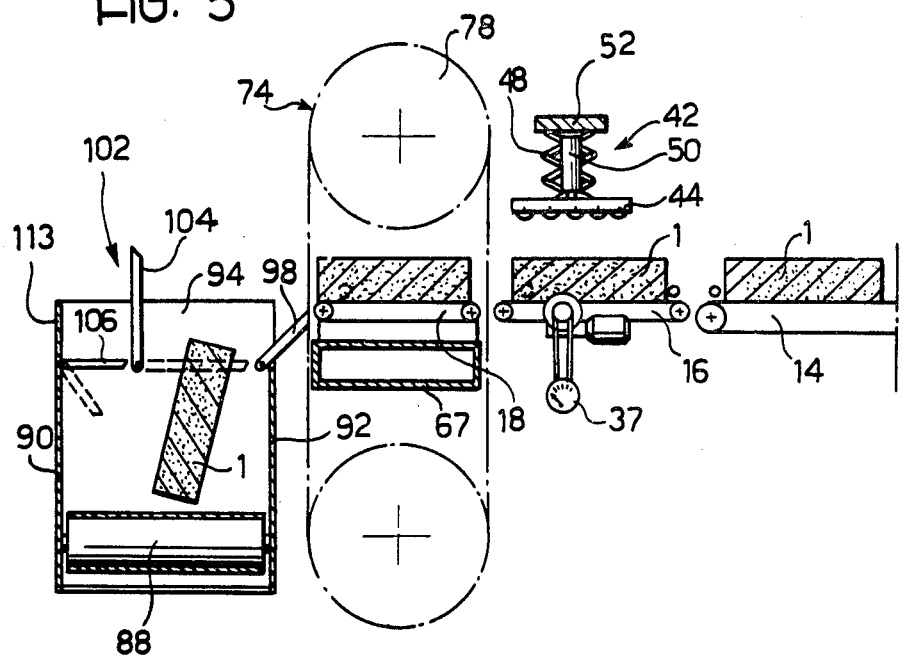
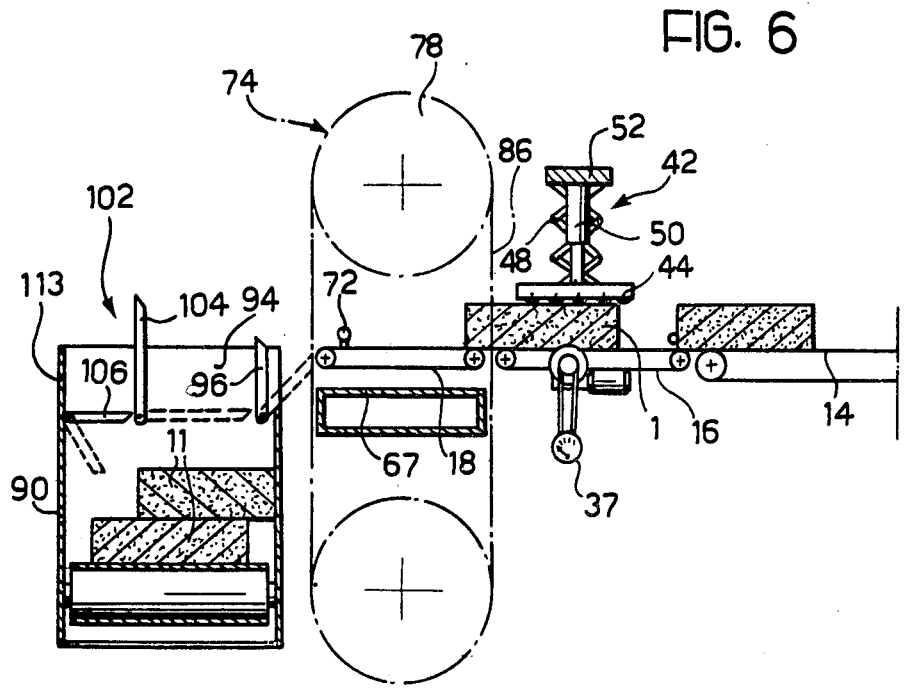

MACHINE FOR THE AUTOMATIC MANUFACTURE OF MIXTURES OF DIFFERENT KINDS OF CAOUTCHOUC INTENDED TO FORM PART OF A FILLER MIXTURE

The present invention relates to a machine for the automatic preparation of mixtures of different kinds of caoutchouc for use as fillers in the manufacture of rubber products, especially tyres.

Typical filler mixtures are made up of different kinds of caoutchouc, lamp black, white fillers, sulphur, oils and chemical ingredients.

The various kinds of caoutchouc fillers are normally delivered to production factories in blocks, of parallelepiped shape, measuring about 18×35×70 cms. and weighing between 30 and 35 kg. These are subsequently fed to a mixing machine. The requisite quantities of the different types of caoutchouc fillers are obtained by cutting blocks of the different kinds of caoutchouc of appropriate weights, according to the recipe giving the desired composition of the mixture.

The measuring of the predetermined quantitites of the different kinds of caoutchouc demands great exactitude and is effected by providing a certain number of whole blocks, or portions of blocks, of the different kinds of caoutchouc until one obtains a weight which is near to, but not exactly, that prescribed by the recipe. Next it is necessary to carry out a first rough weight adjustment by cutting off portions of the blocks of the different types of caoutchouc and if necessary making a final precise adjustment in order to obtain the exact weight prescribed by the recipe.

In known methods of proportioning the ingredients of the caoutchouc mixture rough adjustments of weight are first made with the aid of a guillotine slicer, precision adjustments of weight being made using a hand knife. Such known methods, apart from taking a long time to carry out, also suffer from the disadvantage that slicing with a hand knife involves manual handling of the blocks of caoutchouc which, as has already been said, are of considerable weight. Furthermore, cutting of the blocks by hand is insufficiently precise.

The object of the present invention is to provide a machine for measuring blocks of caoutchouc which will be capable of preparing automatically, and simultaneously, and with a high level of precision, the requisite proportional amounts of different kinds of caoutchouc which make up a filler mixture, allowing such preparation to be carried out at the high production rate required commercially. A further object of the invention is to provide a machine as aforesaid which is sufficiently compact to be installed close to the mixing machine in the place of the presently used manual measuring means, without necessitating substantial rearrangement of the measuring station.

In order to achieve this object, the present invention provides a machine for the automatic preparation of fillers of different kinds of caoutchouc intended to form part of a filler mixture, characterised in that the machine comprises:

a number of conveyor lines arranged side-by-side and equal in number to the number of kinds of caoutchouc; each conveyor line comprising in series a feed conveyor for caoutchouc blocks, a measuring conveyor and a weighing conveyor;

a cutting unit comprising at least one band saw movable from a rest position in which the cutting branch of the saw is outside the path of the caoutchouc blocks on the said conveyor lines so as to complete a working stroke in which the said saw cuts off portions of the blocks projecting from the measuring conveyor towards the weighing conveyors, whilst said conveyors are stationary, followed by a return stroke to said rest position;

scales associated with the weighing conveyor of each conveyor line;

a collector conveyor, movable transversely of the conveyor lines downstream of the latter, said collector conveyor being situated at a lower level than the said conveyor lines;

a storage unit disposed downstream of the conveyor lines at an intermediate level between the said conveyor lines and the collector conveyor, the said storage unit being adapted to store temporarily any excess portions of caoutchouc blocks delivered from the conveyor lines and to deliver said portions to the collector conveyor in the initial phase of a successive measuring cycle, a processor including data storage means for memorising the weights of the different kinds of caoutchouc fillers intended to form part of the mixture, and means for controlling the conveyors of each conveyor line, the cutting unit and the storage unit in dependence upon the stored data and data sent to it by the scales of the weighing units.

The machine according to the invention has the advantage of making it possible to limit human intervention in programming of the processor and in the visual control of the measuring operations, thereby reducing human error, and making it possible to increase the production capacity of the plant for preparing the filler mixtures.

The machine according to the invention furthermore makes it possible to carry out with high precision the operations of measuring caoutchouc blocks, both in cases where the filler mixture recipe requires the addition of a certain number of whole blocks together with fractions of blocks cut to a specific weight, and in the case in which the mixture recipe requires, for one or more kinds of caoutchouc, merely one fraction of a whole block in order to reach the required weight in the mixture recipe.

The invention will be further described, by way of non-limiting example, with reference to the accompanying drawings, in which:

FIGS. 5, 6, 7 and 8 are diagrammatic sectional views corresponding to FIG. 3 and illustrating four successive phases of a cycle for the preparation of the fillers of various kinds of caoutchouc made by the machine according to the invention.

Figure 1:
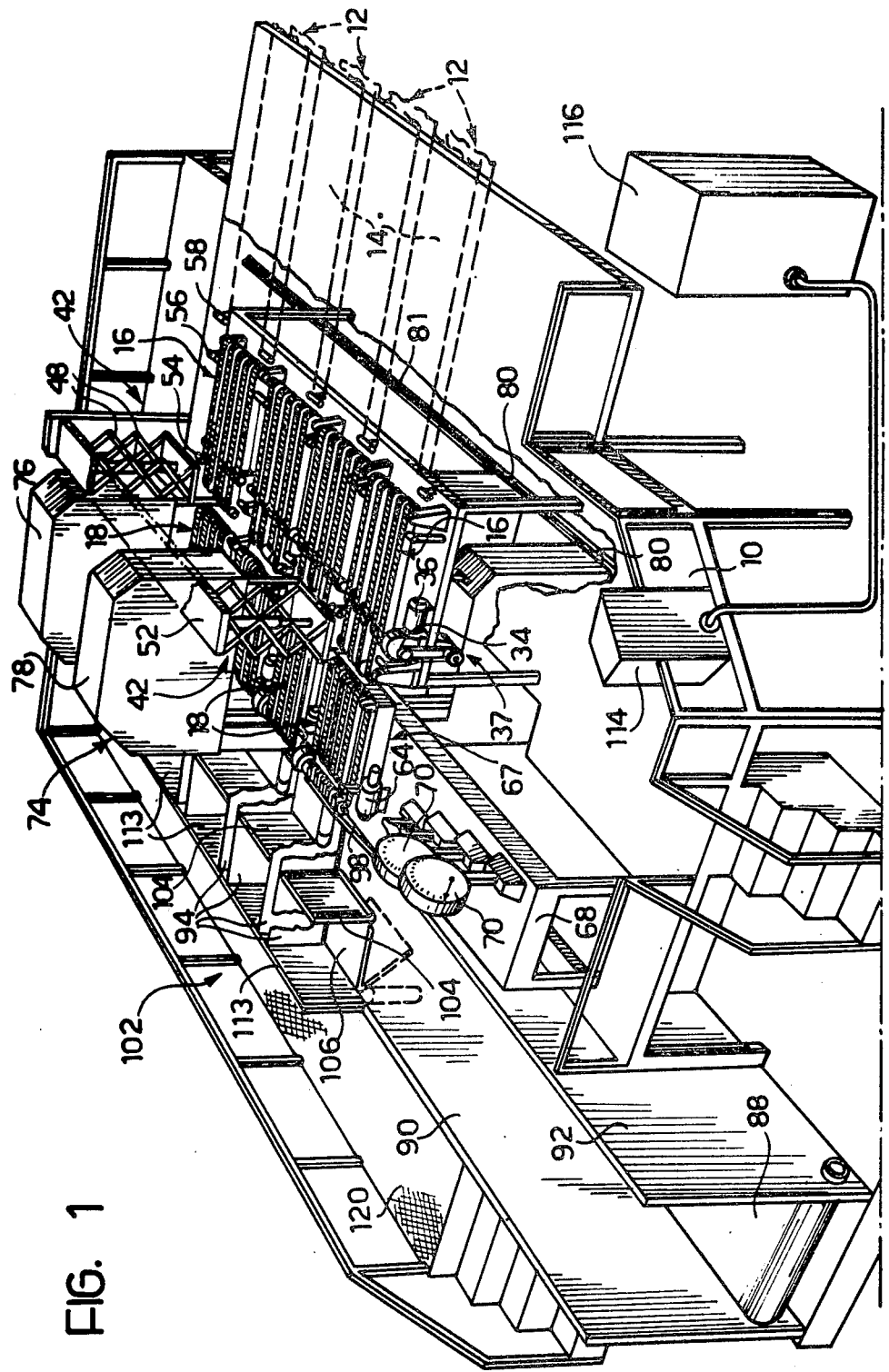
FIG. 1 is a perspective view of a machine according to one embodiment of the invention.
Figure 2:
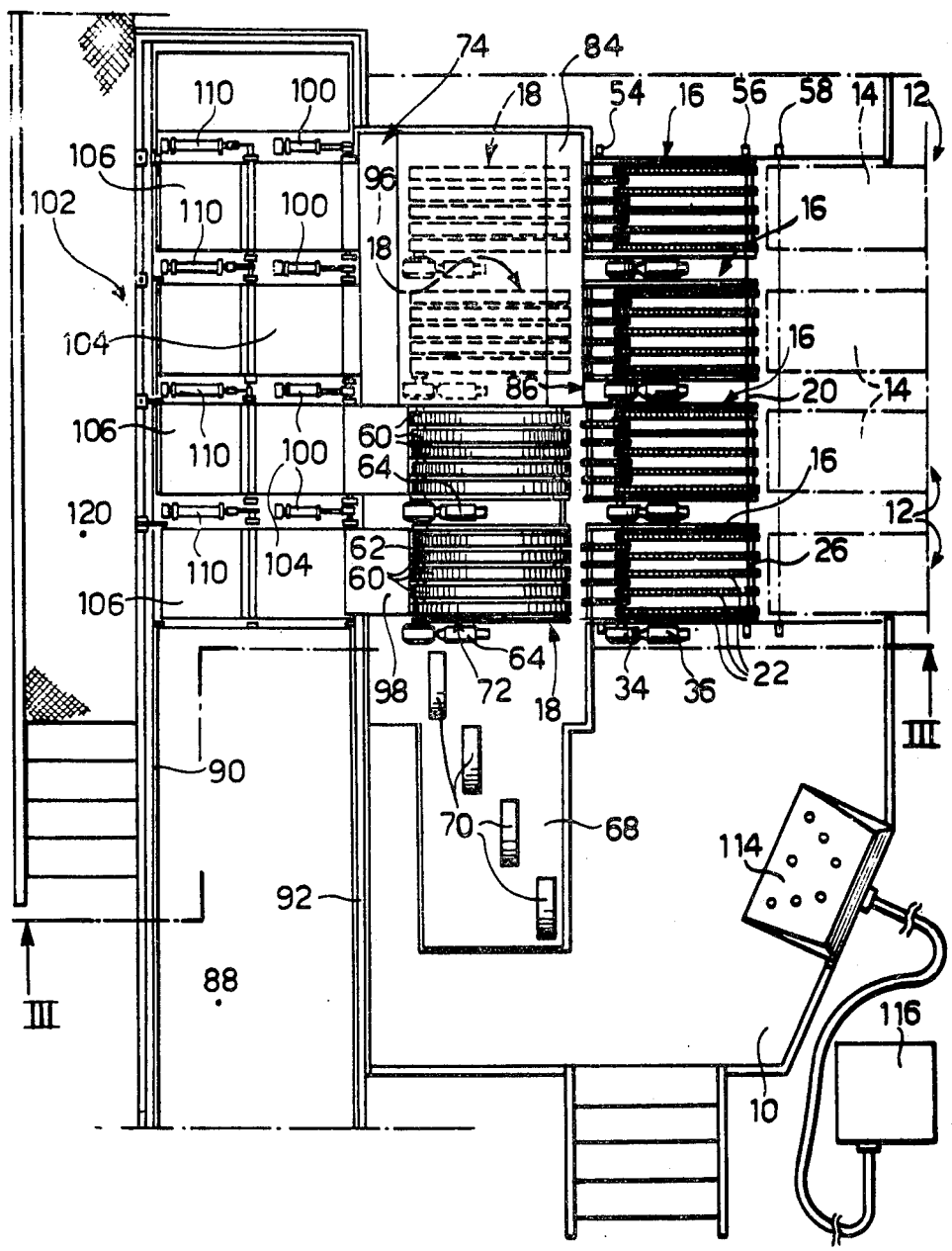
FIG. 2 is a plan view of the machine shown in FIG. 1.
Figure 3:
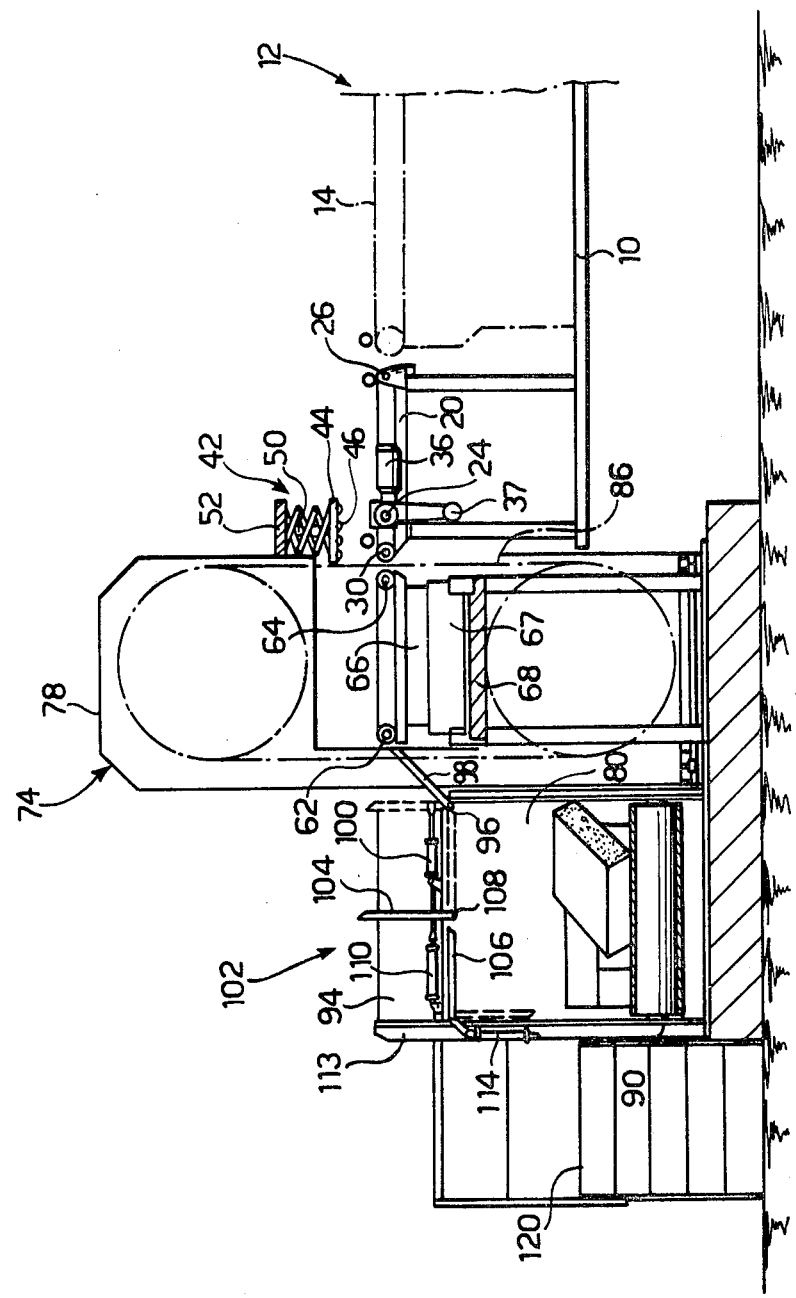
FIG. 3 is a longitudinal sectional view taken along the line III—III of FIG. 2.

Referring to FIGS. 1 to 3, the illustrated machine according to the invention comprises a raised support platform 10 out which there lead a number of parallel conveyor lines 12. The conveyor lines 12, are designed to receive blocks of caoutchouc of different kinds and to transfer these blocks to the platform 10, where measurement of the blocks is carried out for proportioning the different kinds of caoutchouc, required in a given filler recipe, to be delivered to a mixer, not shown, for making up a filler mixture. In the example illustrated there are four conveyor lines 12 and therefore the machine is capable of carrying out the measurement of four different kinds of caoutchouc.

Each conveyor line 12 consists of a feed conveyor 14, a measuring conveyor 16, and a weighing conveyor 18 arranged in series with a common direction of advance.

The feed conveyor 14 of each line 12 serves to feed the blocks of caoutchouc continuously to the measuring conveyor 16, independently of time fluctuations in the loading of blocks onto the said feed conveyor 14. Thus the feed conveyor 14 may consist of a storage conveyor, of a known kind, or else of a conveyor with intermittent feed.

The delivery ends of the feed conveyors 14 are located adjacent a transverse raised table 20 supported by the platform 10 and upon which the associated measuring conveyors 16 are disposed. The measuring conveyors 16 have the dual function of feeding the weighing conveyors 18 at high speed during a first phase of the measuring cycle, and of checking the length of the fractions of blocks which have to be cut off in the final part of the measuring cycle, as will be further described.

Each measuring conveyor 16 comprises a number of first toothed conveyor belts 22 each meshing at one end with a toothed drive pulley driven by a drive shaft 24 adjacent the respective weighing conveyor 18, and at the other end with a toothed pulley carried by an idle shaft 26 adjacent the respective feed conveyor 14. The measuring conveyor 16 further comprises a number of second toothed conveyor belts 28 interposed between and parallel to the first toothed conveyor belts 22, and each meshing with a respective toothed drive pulley driven by the drive shaft 24 and with a toothed pulley mounted upon a second idle shaft 30 disposed adjacent the weighing conveyor 18. The length of the second conveyor belts 28 is less than the length of the first conveyor belts 22 and is substantially less than the standard length of the caoutchouc blocks. The first conveyor belts 22 and the second conveyor belts 28 are provided with transverse ribs on their outer surfaces, for the purpose of increasing the friction between the blocks of caoutchouc and the conveyor belts, particularly when the blocks are being accelerated from rest on the measuring conveyor 16.

The drive shaft 24 of each measuring conveyor 16 is connected, through a gear reduction unit 34, to an electric motor 36. An hydraulic motor may be used in place of the electric motor 36.

Each measuring conveyor 16 is provided with a sensor 37 of the angular position of the drive shaft 24. This sensor 37 may consist, for example, of a phonic wheel driven by a toothed belt from the drive shaft 24 and associated with a magnetic pick-up.

The drive shaft 24 and the second idle shaft 30 of each measuring conveyor 16 supports, in the spaces between the toothed conveyor belts 22 and 28, wheels 40 having radial pointed spikes arranged to penetrate into the blocks of caoutchouc in order to prevent any slipping by the said blocks relative to the measuring conveyor 16.

The measuring conveyors 16 are each associated with pantograph presser 42 arranged to press the blocks of caoutchouc against toothed wheels 40. Each presser 42 includes a plate 44 having a series of downwardly projecting idle rollers 46 and connected on opposite sides to a pair of pantographs 48 and to a fluid pressure actuator 50. The pantographs 48 and the actuator 50 are suspended from a transverse support 52 fixed above the second toothed conveyor belts 28 of the measuring conveyors 16.

Each measuring conveyor 16 is provided with a photoelectric sensor switch 54, disposed immediately downstream of the drive shaft 24 and with a photoelectric sensor switch 56 disposed immediately downstream of the first idle shaft 26. The sensor switches 56 are adapted to cooperate with similar switches 58 located close to the delivery ends of the respective feed conveyors 14. The action of the switches 54, 56 and 58 will be described later.

Each weighing conveyor 18 comprises a number of toothed conveyor belts 60, similar to the conveyor belts 22 and 28, each meshing with a pair of toothed pulleys carried respectively by a drive shaft 62 and by an idle shaft 63 adjacent the measuring conveyor 16. The drive shaft 62 is driven by an electric motor 64 through a reduction gear similar to that previously described with reference to the measuring conveyor 16.

The drive shaft 62 and the idle shaft 63 of each weighing conveyor 18 are rotatably supported by the movable platform 66 of a weighing scale 67 adapted to weigh the blocks of fractions of blocks of caoutchouc delivered from the associated measuring conveyor 16. The weighing scales 67 are supported by a transverse support table 68 mounted on the platform 10 and carrying at one end four weight indicators 70 connected to the respective scales 67.

Respective photoelectric sensor switches 72 are associated with the delivery ends of the respective weighing conveyors, the sensor switch 72 being similar to the sensor switch 54, 56 and 58.

Reference numeral 74 indicates a cutting unit consisting of a pair of endless band saws 76, 78 of known type. The cutting unit 74 is mounted on wheels 8 driven by an electric motor 82 for movement along a pair of rails 81 directed transversely of the conveyor lines 12. The cutting unit 74 moves, starting from a rest position in which the cutting branches 84 and 86 of the band saws 76 and 78 are outside the path of the blocks of caoutchouc along the conveyor lines 12, so as to complete a working stroke in order to effect cutting to the portions of the blocks projecting from the measuring conveyors 16 towards the weighing conveyors 18 so as to complete the measuring of the caoutchouc fillers, the unit 74 subsequently effecting a return stroke to the rest position. The distance between the blades of the saws 76 and 78 is slightly greater than the distance between the outer longitudinal edges of the weighing conveyors 18 of two adjacent conveyor lines 12.

Reference numeral 88 indicates a collector conveyor belt which is moved transversely downstream of the conveyor lines 12 for collecting the blocks or portions of blocks of caoutchouc delivered from the conveyor lines 12. The conveyor belt 88 feeds the said blocks to a mixing machine (not shown). The collector conveyor belt 88 is situated at a lower level than the level of the conveyor lines 12, and is bounded on opposite sides by vertical side walls 90, 92.

Four pairs of separating walls 94 span the upper edges of the walls 90 and 92 and are aligned with the longitudinal edges of the four weighing conveyors 18.

In the gap between each pair of walls 94, the inner vertical side wall 92 supports a shaft 96 extending parallel to the upper edge of the wall 92. A delivery flap 98 is hinged upon the shaft 96. Each flap 98 is movable by a fluid pressure actuator 100 between an inclined position, shown in solid outline in FIG. 3, in which its free end is adjacent the delivery end of the respective weighing conveyor 18, and a vertical position, shown as dashed outline in FIG. 3, in which its free end is uppermost. In this vertical position the flap 98 allows the passage of the rear part of the cutting unit 74 during the cutting of the blocks of caoutchouc.

The vertical side walls 90, 92 also support a storage unit 102 located between the walls 90, 92. The storage unit 102 comprises four first hinged flaps 104 aligned with the delivery flaps 98, and four second hinged flaps 106 aligned with the first flaps 104.

Each first flap 104 is hinged at one end about a shaft 108, parallel to the shaft 96, supported by the respective pair of separating walls 94 and is movable by a respective fluid pressure actuator 110. Each actuator 110 moves the flap 104 between a horizontal position, shown in broken outline in FIG. 3, in which its free end is adjacent the hinged end of the delivery flap 98, and a vertical position in which its free end is uppermost as shown in solid outline in FIG. 3.

Each second flap 106 is hinged at one end about a horizontal shaft 112 supported by the outer side wall 90 of the conveyor belt 88 between a pair of respective separating walls 94. The flap 106 is movable by a fluid pressure actuator 114 between a horizontal position in which its free end is adjacent the hinged end of the first flap 104 and a vertical position in which its free end is lowermost and adjacent the collector conveyor belt 88, as shown in broken lines in FIG. 3.

The storage unit 102 also includes four fixed longitudinal walls 113 which are effectively vertical extensions of the side wall 90 and which are located between each pair of transverse separating walls 94.

The storage unit 102, the operation of which will be described later, makes it possible to store temporarily any excess portions of caoutchouc blocks delivered from the conveyor lines 12 in the final stage of each measuring cycle, and to feed these portions to the collector conveyor belt 88 in the initial stage of a successive measuring cycle.

A control console 114 is supported by the platform 10 and connected to a processor 116 which includes a microprocessor designed to control, automatically, the four conveyor lines 12 and to control the various phases of the measuring cycles. The processor 116 includes a data store for memorising the weights of the different types of caoutchouc during the measuring cycle and to control the conveyors of each conveyor line 12, the cutting unit 74 and the hinged flaps of the storage unit 102, in relation both to the stored data and to data transmitted to it by the scales 67 associated with the respective weighing conveyors 18.

Figure 4:
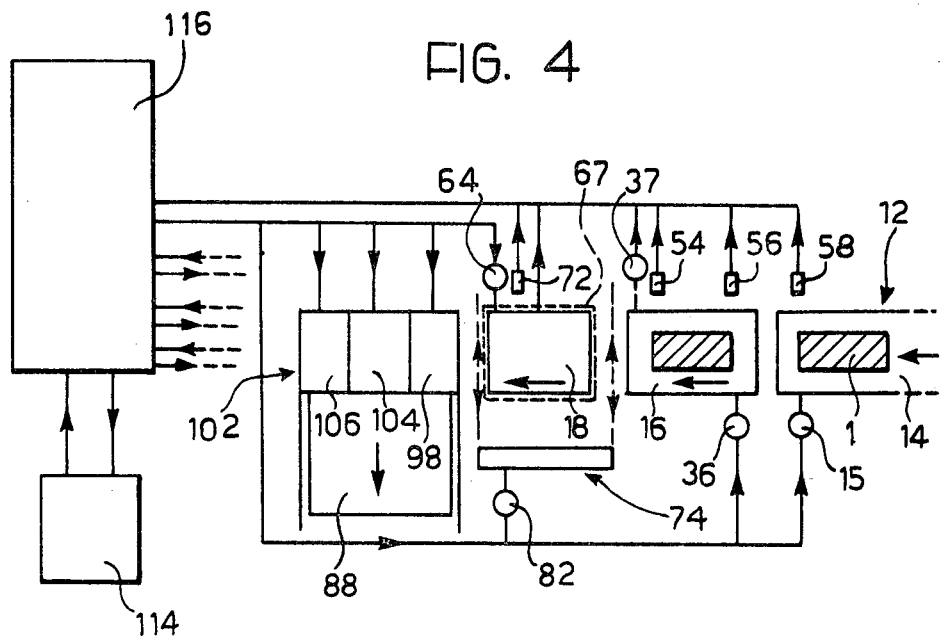
FIG. 4 is a schematic plan view which shows diagrammatically the control circuit of the machine illustrated in FIGS. 1 to 3.
Figure 9:
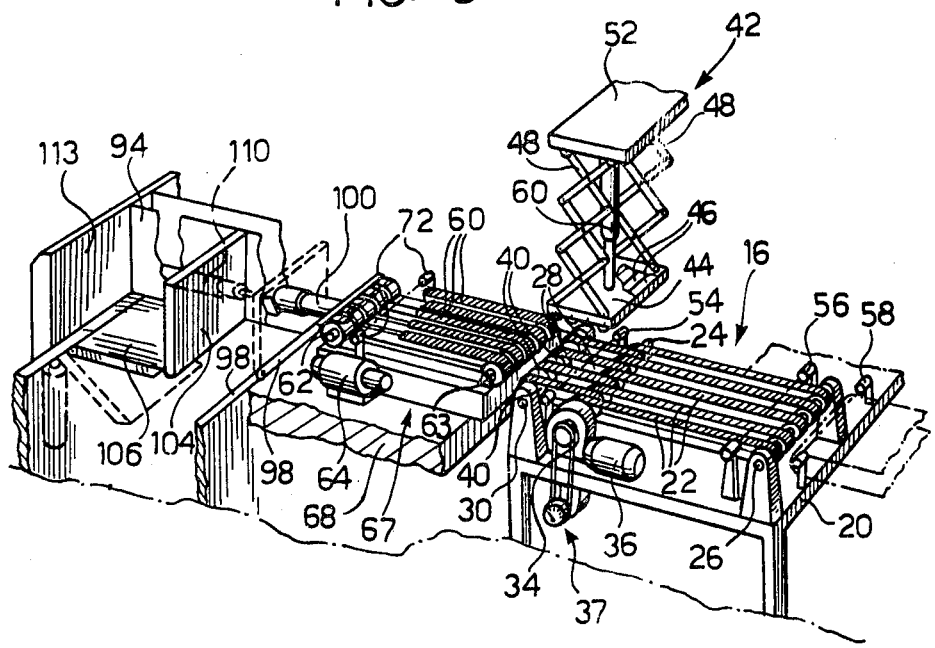
FIG. 9 is a perspective view on an enlarged scale of a detail of the machine illustrated in FIG. 1.

FIG. 4 shows diagrammatically the connections of the processor 116 to one of the conveyor lines 12, it being understood that the connections of the processor 116 to the other conveyor lines 12 are identical. Thus the processor 116 is connected to the drive motor 15 of the feed conveyor 14, to the motor 36 of the measuring conveyor 16, to the motor 64 of the measuring conveyor 18, to the photoelectric sensor switches 54, 56, 58 and 72, to the scale 67 and to the angular position sensor 37 of the measuring conveyor 16. The processor 116 is also connected to the motor 82 which drives the cutting unit 74, and to the control valves, not shown, of the actuators 100, 110 and 114 of the storage unit 102.

The machine according to the invention is provided with a peripheral walkway 120, situated on the same level as the platform 10, from which visual checking of the operation of the machine can be made by experienced operators.

The automatic operation of the machine according to the invention is as follows. The processor 116 is programmed using a keyboard (not shown) with data relating to the name of the recipe and to the number of mixture preparations according to the recipe to be prepared, and, for each of the four lines 12, with data related to:

the weight of each caoutchouc component of the mixture to be preapred;
the average length of the blocks of caoutchouc;
the average weight of the blocks of caoutchouc,
the percentage of tolerable error on the final weight.

The data imposed are transferred to the control console 114, which is provided with a display, not illustrated, upon which are displayed the data related to the name of the recipe and to the number of preparations to be prepared and for each of the conveyor lines 12, data indicating the weight to be reached and the weight actually reached at each instant.

After the input of the necessary data, the processor 116 automatically establishes the validity and correctness of the imposed data, and calculates, for each conveyor line 12, the theoretical number of whole blocks necessary to be delivered as closely as possible to the value required by the recipe. At the end of this operation the processor 116 initiates the measuring operations.

Initially the whole blocks of caoutchouc 1 are fed to the feed conveyors 14 and delivered to the measuring conveyors 16 and then to the weighing conveyors 18. At this stage the angular position sensors 37, the sensor switches 54, the cutting unit 74 and the storage unit 102 remain inoperative. When the whole blocks 1 arrive in correspondence with the sensors 72, the processor 116 interrupts the feed to the conveyor lines 12, so as to allow the scales 67 to weigh the blocks 1 and to transmit the value recorded to the processor 116. At the end of weighing operation the processor 116 reactivates the lines 12, halting the feeding of the blocks 1 to the collector conveyor 88. During this phase the delivery flaps 98 are in the inclined position shown in FIG. 5, and the first flaps 104 are in the vertical position, allowing the blocks 1 to pass through into the storage unit 102. The pressers 42 associated with the measuring conveyors 16 are kept in the raised position, and the photoelectric sensor switches 56 and 58 allow axial spacing of the blocks along the measuring conveyor 16. In fact, the contemporaneous tripping of the sensor switches 56 and 58 brought about by the presence of two blocks 1 close together causes the drive motor 15 of the feed conveyor 14 to be stopped.

This operational phase continues until, a weight is reached on all the conveyor lines 12 which is less than the weight required by the recipe by the weight of one whole block. Inasmuch as this condition does not normally occur contemporaneously on all the conveyor lines 12, the processor 116 provides, by virtue of the stored weight data, for progressive stopping of each respective line 12 when the aforesaid condition is reached.

When the difference between the required weight and the actual weight delivered is less, on all four conveyor lines 12, than the weight of one whole block, then the processor 116 initiates the cutting cycle. During the cutting cycle the processor 116 calculates, for each conveyor line 12, the quantity, represented by length of whole blocks to be cut in order to reach the required weight.

The processor 116 causes the operation of the conveyor lines 12 and lowering of the pressers 42 so as to press the block which is present on each measuring conveyor 16 against the toothed belts of each conveyor 16. Closure of the sensor switch 54 consequent upon the arrival of the block 1 triggers a reference signal which allows the processor 116 to stop the line when the angular position sensor 37 signals the occurrence of linear movement of the block porportional to the weight of the block 1 to be cut off, previously determined. During this phase, the toothed wheels 40 of the measuring conveyor 16 ensure, in cooperation with the presser 42, correct correspondence between the angular movement of the drive shaft 24 of the conveyor 16 and the linear movement of the block 1, preventing any sliding of the block relative to the conveyor 16.

As soon as the blocks 1 on the conveyors 16 reach the correct cutting position, the processor 116 initiates movement of the delivery flaps 98 into the vertical position shown in solid outline in FIG. 6, and activates the cutting unit 74. The cutting branches 84, 86 of the band saws 76 and 78 then cut off the portions of the blocks 1 which project from the measuring conveyors 16 onto the weighing conveyors 18. As soon as the cutting unit 74 returns into its rest position, the processor 116 causes reactivation of the conveyor lines 12, until the severed pieces 1' reach the sensors 72, when the scales 67 effect weighing of the pieces 1 while the processor 116 stores the weight data provided by the scales 67.

Figure 7:
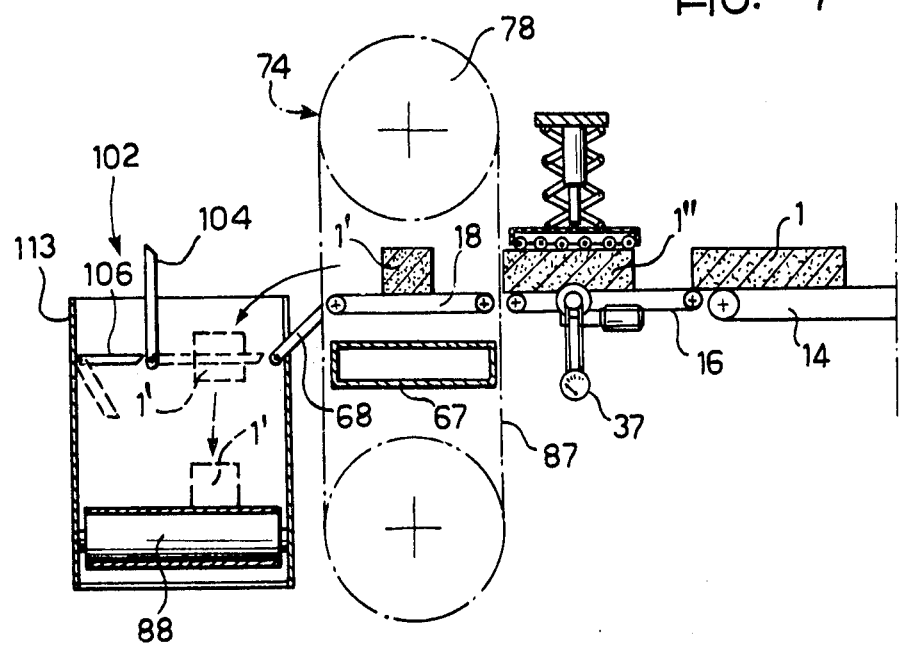

At the end of the weighing stage the processor 116 initiates movement of the delivery flaps 98 into the inclined positions shown in FIG. 7, and activates the conveyor lines 12 so as to feed the severed pieces 1' to the collector conveyor belt 88. Should the block cutting operation fail to achieve the prescribed weight for any one component on one or more of the conveyor lines 12 the aforesaid block cutting cycle is repeated, those conveyor lines 12 in which the prescribed weight has been reached being rendered inactive by the processor 116.

Figure 8:
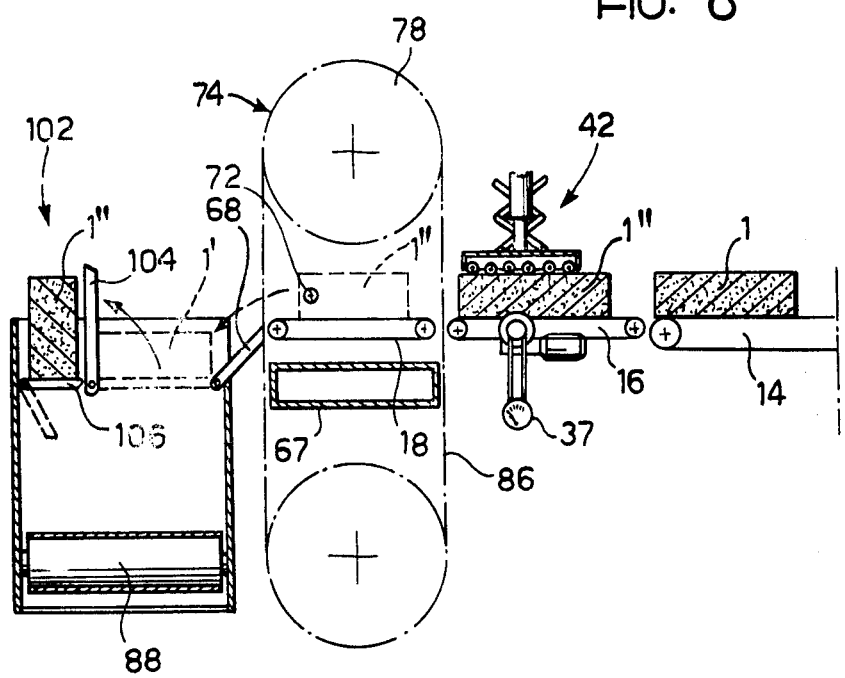

FIG. 8 illustrates the situation in which the portion 1" of a block 1 remaining after the first cutting operation cannot be cut, since its length is too small for it to be engaged efficiently by the presser 42: in practice the limiting length of the block portion 1" below which the presser 42 would be ineffective is substantially one third of the total length of the block 1. In this case the processor 116 feeds the portion 1" to the weighing conveyor 18, which weighs the portion 1" and feeds it to the storage unit 102. In this case the first flap 104 of the storage unit 102 is held inititally in the horizontal position illustrated by a dashed line in FIG. 8, for the purpose of picking up the block portion 1".

Next, the first flap 104 is moved into the vertical position shown in solid outline in FIG. 8, so as to transfer the portion 1" on to the second movable flap 106, which is kept in the horizontal position shown in solid outline in FIG. 8. The block portion 1" is thus stored by the storage unit 102 until the measuring of the caoutchouc blocks has been completed. The block portion 1" is then fed to the collector conveyor belt 88 during the initial phase of a subsequent measuring cycle, due to downward movement, into the position shown by a dashed line in FIG. 8, of the second flap 106.

The machine according to the invention also provides for a "single" operating cycle which can be carried out as a test measuring cycle. During this "single" test cycle, all the operations previously described are carried out, with the sole difference that, when the data from the processor 116 are imposed, the number of recipes to be prepared is put at equal to 1.

In the event of interruption of the feed, or breakdown of the processor 116, the data imposed or obtained during the various stages of the cycle are memorised in a non-volatile memory, so that when operations recommence it is possible to start from the point at which they were stopped.

From the foregoing description it will be apparent that the machine according to the invention makes it possible to effect, with high precision, measuring operations, both in the case in which the mixture recipe requires, initially, a certain number of whole blocks 1, and subsequently fractions 1' of whole blocks in order to achieve the prescribed weight, and also in the case in which the recipe requires, for one or more kinds of caoutchouc present on the conveyor lines 12, simply one of more fractions 1' of whole blocks.

The machine according to the invention is also compact and of limited size and can therefore be installed in the immediate vicinity of a mixing machine in place of the former manual measuring equipment, without it being necessary to reconstruct the measuring stations.

It will be understood that details of construction of practical embodiments may be varied widely in relation to what has been described and illustrated, without going beyond the scope of the present invention.

What is claimed is:

1. Machine for the automatic preparation of fillers of different kinds of caoutchouc intended to form part of a filler mixture, wherein the machine comprises:

a number of conveyor lines arranged side-by-side and equal in number to the number of kinds of caoutchouc, each conveyor line comprising in series a feed conveyor for caoutchouc blocks, a measuring conveyor and a weighing conveyor;

a cutting unit comprising at least one band saw having a rest position in which the cutting branch of the saw is outside the path of the caoutchouc blocks on the said conveyor lines, means for moving the cutting unit to complete a working stroke in which said saw cuts off portions of the blocks projecting from the measuring conveyors towards the weighing conveyors, whilst said conveyors are stationary, followed by a return stroke to said rest position;

weighing means associated with the weighing conveyor of each conveyor line;

control means for controlling the operation of the weighing means and the measuring and weighing conveyors in successive measuring cycles;

a collector conveyor, movable transversely of the conveyor lines downstream of the latter, said collector conveyor being situated at a lower level than the said conveyor lines;

a storage unit disposed downstream of the conveyor lines at an intermediate level between said conveyor lines and said collector conveyor, said storage unit being adapted to store temporarily any excess portions of caoutchouc blocks delivered from the conveyor lines in a measuring cycle and to deliver said portions to the collector conveyor in the initial phase of a successive measuring cycle, a processor including data storage means for memorising the weight of the fillers of the different kinds of caoutchouc intended to form part of the mixture, said processor being operatively associated with the control means for controlling the conveyors of each conveyor line, the cutting unit and the storage unit in dependence upon the stored data and data sent to it by the weighing means of the weighing conveyors.

2. Machine as in claim 1, and further including a presser associated with the measuring conveyor, the presser being adapted to press the blocks of caoutchouc against the said measuring conveyor during each working stroke of the cutting unit.

3. Machine as in claim 1, wherein each conveyor line includes a pair of sensor switches situated respectively in correspondence with the delivery end of the feed conveyor and in correspondence with the initial part of the measuring conveyor and arranged to be closed in succession by the passage of the blocks of caoutchouc; simultaneous closure of the said two switches causing the feed conveyor to stop, so as to space the blocks axially along the measuring conveyor.

4. Machine as in claim 1, wherein each conveyor line also includes a switch situated close to the delivery end of the measuring conveyor and arranged to be closed by the passage of a block or portion of a block of caoutchouc, closure of said switch causing the associated conveyor line to stop in order to allow the weighing operation to be carried out, reactivation of said conveyor line being controlled by the said processor upon completion of weighing operations.

5. Machine according to claim 1, wherein the conveyor lines are four in number and the cutting unit comprises two band saws the saw blades of which are spaced apart by a distance slightly greater than the distance between the outer longitudinal edges of the weighing conveyors of two adjacent said conveyor lines.

6. Machine as in claim 1, and further including a pair of vertical side walls disposed along the longitudinal edges of the collector conveyor, the said side walls supporting the storage unit, a number of pairs of transverse separating walls aligned with the longitudinal edges of the weighing conveyors, and a number of movable delivery flaps hinged at one end about shafts supported at the top of the vertical side wall of the collector conveyor nearer the weighing conveyors in the areas between the pairs of transverse separating walls, each said delivery flap being movable between a delivery position in which its free end is adjacent the delivery end of the associated weighing conveyor and a vertical position in which its free end is uppermost in order to allow the working stroke of the cutting unit.

7. Machine as in claim 6, wherein the storage unit includes:

a number of first movable flaps each hinged at one end around a longitudinal shaft supported by a pair of transverse separating walls, each first flap being movable between a horizontal position in which its free end is adjacent the vertical side wall of the collector conveyor nearer the weighing conveyors, and a vertical position in which its free end is uppermost;

a number of second movable flaps each hinged at one end around a longitudinal shaft supported at the top of the other vertical side wall of the collector conveyor between a respective pair of said transverse separating walls, each second flap being movable between a horizontal position in which its free end is adjacent the hinged ends of the associated first flap and a vertical position in which its free end projects downwards towards the collector conveyor, and a number of fixed longitudinal walls which are effectively vertical extensions of said other side wall of the collector conveyor in the areas between each pair of said transverse separating walls.

8. Machine as in claim 1, wherein the measuring conveyor of each conveyor line comprises a number of first spaced apart toothed conveyor belts, a toothed drive pulley engaging each said first belt and a drive shaft carrying said drive pulley adjacent the weighing conveyor, a toothed idle pulley engaging each said first belt and an idle shaft carrying said idle pulley adjacent the feed conveyor, and a number of second toothed conveyor belts interposed between adjacent said first toothed conveyor belts, a toothed drive pulley engaging each said second belt, mounted upon said drive shaft, a toothed idle pulley engaging each said second belt and a second idle shaft carrying said idle pulley adjacent the weighing conveyor, the length of the second toothed conveyor belts being less than the length of the first toothed conveyor belts, and the said first and second toothed conveyor belts being provided with teeth upon their outer surfaces.

9. Machine as in claim 8, wherein the measuring conveyor also includes a number of wheels having radial pointed spikes, said wheels being rotatably supported by the drive shaft and by the second idle shaft, in the gaps between the first and second conveyor belts.

10. Machine as in claim 8 or claim 9, wherein the measuring conveyor also includes sensor means responsive to the angular position of the drive shaft and sensor means responsive to the passage of the blocks of caoutchouc; said block sensor means being situated immediately downstream of the drive shaft and being connected to the processor so as to stop the measuring conveyor after a predetermined angular movement of the said drive shaft detected by the angular position sensor means in order to allow the cutting operation to be carried out.

* * * * *